(12) United States Patent
Quan

(10) Patent No.: US 7,236,683 B2
(45) Date of Patent: Jun. 26, 2007

(54) METHOD AND APPARATUS FOR PROVIDING OR ENHANCING COPY PROTECTION BY ADDING SELECTED NEGATIVE-GOING AND POSITIVE-GOING PULSES IN A VIDEO SIGNAL HBI

(75) Inventor: Ronald Quan, Cupertino, CA (US)

(73) Assignee: Macrovision Corporation, Santa Clara, CA (US)

( * ) Notice: Subject to any disclaimer, the term of this patent is extended or adjusted under 35 U.S.C. 154(b) by 1119 days.

(21) Appl. No.: 09/998,808

(22) Filed: Nov. 15, 2001

(65) Prior Publication Data

US 2003/0091335 A1    May 15, 2003

(51) Int. Cl.
*H04N 11/00* (2006.01)
(52) U.S. Cl. .............................. 386/1; 386/94; 386/95; 386/96
(58) Field of Classification Search .................. 386/94, 386/1, 95, 96
See application file for complete search history.

(56) References Cited

U.S. PATENT DOCUMENTS

| 4,163,253 A | * | 7/1979 | Morio et al. ................ 380/204 |
| 5,608,799 A | * | 3/1997 | Ryan et al. .................. 380/213 |
| 6,188,832 B1 | * | 2/2001 | Ryan ............................. 386/94 |
| 6,271,889 B1 | * | 8/2001 | Bohm et al. ................. 348/531 |
| 7,050,698 B1 | * | 5/2006 | Quan ............................. 386/1 |
| 2006/0056809 A1 | | 3/2006 | Quan | |

* cited by examiner

Primary Examiner—Thai Q. Tran
Assistant Examiner—Helen Shibru
(74) Attorney, Agent, or Firm—George B. Almeida

(57) ABSTRACT

The horizontal blanking interval (HBI) of a normal video signal is modified to enhance the playability of the applied copy protected video signal while maintaining the copy protection effectiveness. As generally known, a copy protected video signal with positive-going pulses in a back porch region causes possible black level depression. The addition of a negative-going pulse and/or negative-going and positive-going pulse pair immediately prior to the H sync signal in the front porch region causes a reduction in such black level depression while resulting in enhanced playability. In other embodiments, an amplitude extending pulse is added to a latter portion of the H sync pulse or to a latter portion of a pseudo sync pulse, to increase the negative-going amplitude of the respective pulse. Various combinations of the added pulses also are possible.

48 Claims, 5 Drawing Sheets

METHOD AND APPARATUS FOR PROVIDING OR ENHANCING COPY PROTECTION BY ADDING SELECTED NEGATIVE-GOING AND POSITIVE-GOING PULSES IN A VIDEO SIGNAL HBI

BACKGROUND OF THE INVENTION

The present invention relates to a video signal copy protection process and apparatus, and more particularly to a technique for providing or enhancing copy protection of video signals via the addition of special negative-going pulses as well as special positive-going pulses in some embodiments, within selected portions of front porch regions in the video signal horizontal blanking interval (HBI).

In the field of video signal copy protection, copy protection processes are well known for modifying a video signal so that a normal color picture may be produced by a television receiver receiving the copy protected video signal, but wherein videotape recording of the copy protected video signal is inhibited and/or is so degraded in quality as to be unwatchable. In addition, many processes have been developed which enhance or otherwise improve upon the many basic copy protection processes.

Typical of such processes is that disclosed in U.S. Pat. No. 4,631,603 issued to J. Ryan in Dec. 23, 1986, and herein incorporated by reference, which capitalizes on the fact that a typical video cassette recorder's (VCR) automatic gain control (AGC) system cannot distinguish between the normal sync pulses of a conventional video signal (including equalizing or broad pulses) and added pseudo-sync pulses. Pseudo-sync pulses are defined here as any other pulses which extend down to a normal sync tip level and which have a duration of at least 0.5 microseconds. A plurality of such pseudo-sync pulses is added to the conventional video signal during the vertical blanking interval, and each of such pseudo-sync pulses is followed by a positive pulse of suitable amplitude and duration. As a result, the automatic gain control system in a videotape recorder will make a false measurement of video level which causes an improper recording of the video signal. The result is unacceptable picture quality during playback. However, this approach utilizes positive-going pulses which occur at a time not ordinarily used for black-level restoration in typical television receivers and therefore does not give rise to black level depression in such typical television sets, whereby a television set (TV) displays a picture of fully acceptable quality.

Another copy protection process is disclosed in U.S. Pat. No. 4,819,098 issued to J. Ryan on Apr. 4, 1989 and incorporated herein by reference, which capitalizes on the fact that VCRs include the AGC system which here measures the sync pulse level in a video signal and develops a gain correction signal for keeping the video level applied to an FM modulator in the VCR system at a fixed, predetermined value. A plurality of positive pulses are added to the video signal with each immediately following a respective trailing edge of a normally occurring sync pulse. These added pulses are clustered at the vertical blanking interval of each field to minimize the affect of the same on the watchability of the picture defined by the signal, but still cause the automatic level control circuit in a VCR to assess the video level at many times its actual value thereby providing a copy of unacceptable picture quality. The sync pulses themselves can also be at a reduced level, in order to enhance the effectiveness of the copy protection process.

A further copy protection process is disclosed in U.S. Pat. No. 4,163,253 issued to M. Morio et al. on Jul. 31, 1979, wherein the AGC circuit of a VCR again prevents recording an acceptable copy of a copy protected video signal. A pulse whose amplitude is substantially equal to the peak white level of the video signal is inserted into respective horizontal blanking intervals of the video signal. If this modified video signal is recorded on a conventional type of video signal recorder, the presence of the inserted pulse signal is detected by the AGC detector which, in turn, controls an AGC amplifier to substantially attenuate the modified video signal which then is recorded. The resulting recording is of unacceptable picture quality.

It has been found that the copy protection signals of various copy protection processes which employ positive-going pulses, such as AGC pulses, in the back porch region of the HBI, may experience various degrees of playability problems such as for example black level depression. In the field of copy protection, it obviously is necessary to maximize the effectiveness of the copy protection of a recorded video signal. However, it is equally necessary to maintain the playability of the copy protected video signal by reducing the amount of side effects such as darkening of the TV set monitor during playback of the video signal, playback of a legal copy of the video signal, etc. It follows that it would be advantageous to maximize not only the effectiveness of a copy protection process against illegal copying but also the playability of the video signal by a legitimate TV set.

SUMMARY OF THE INVENTION

The present invention provides a process and apparatus for maximizing video signal copy protection while also enhancing the playability of a legitimate playback of the copy protected video signal.

To this end, the various embodiments of the invention add selected special pulses to selected regions in the HBI of the video signal. In one embodiment, a modified horizontal sync (H sync) pulse is added in the front porch region of the HBI. The modified H sync pulse is a relatively narrow negative-going pulse, hereinafter also termed a "presync" pulse for ease of description. A positive-going pulse of even narrower width is added following the negative-going modified presync pulse within the front porch region. Both pulses are inserted immediately before the normal horizontal sync (H sync) signal of normal duration, for example, 4.7 microseconds (µs) width. The negative-going presync and positive-going pulses have a combined time duration about equal to the duration of the front porch.

In another embodiment, a latter portion of the amplitude of the H sync signal is increased to below its normal or clipped H sync tip level. For example, the H sync tip level of the latter portion can be extended by an amplitude of about 10 to 50 IRE. Thus, if normal H sync signals are 4.7 µs in width, the invention process provides an additional amplitude extending pulse of for example about 1.0 µs width and about −40 IRE, superimposed onto a latter 1.0 µs portion of the H sync signal to provide an amplitude augmented H sync signal of about −80 IRE during the last 1.0 µs of the pulse. The amplitude extending pulse can also be added to the latter portion of pseudo sync pulses as well. The H sync and/or pseudo sync signals also may be clipped. An example of the clipped H sync tip level and/or the pseudo synch level of previous mention is about −30 IRE.

In either of the above embodiments the sampling circuits of a VCR sample the signal in the HBI at other than the normal time thereby resulting in an erroneous AGC gain level that in turn will turn the gain down. Thus, a subsequent recording made by the VCR will be darkened and unacceptable for watching. However, the added pulses do not affect the determination of the black level in the TV set since the samples taken by the circuit in the TV set average out and cause the black level to be sampled at a preferred point in the back porch region.

DETAILED DESCRIPTION OF THE PREFERRED EMBODIMENTS

Figure 1:
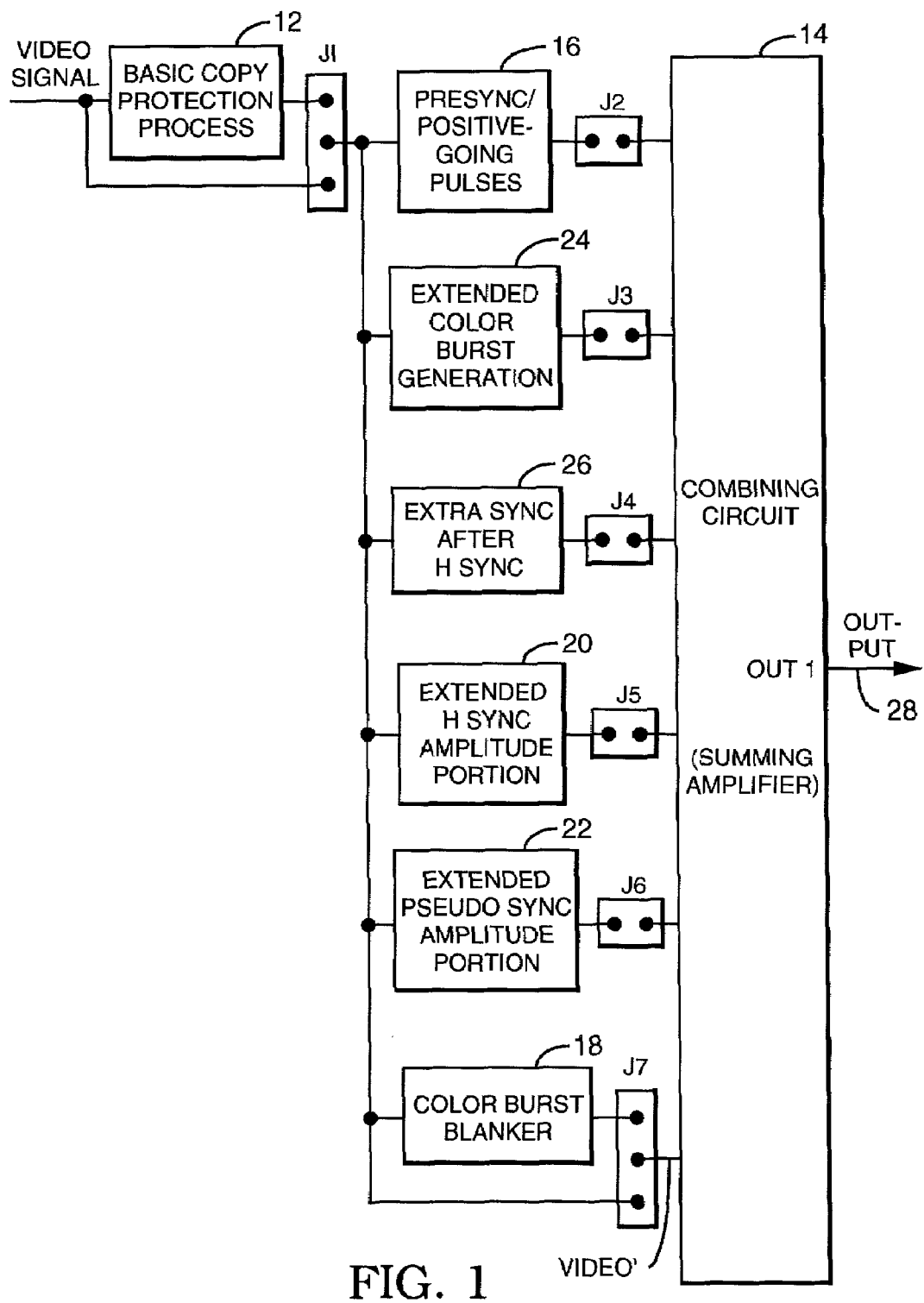
FIG. 1 is a block diagram illustrating various embodiments of the invention wherein respective modifications are applied to a normal video signal or to a copy protected video signal.

FIG. 1 is a basic block diagram illustrating various modifications and associated apparatus corresponding to the several embodiments of the invention, and the manner of applying one, or a combination, of the modifications to an incoming video signal which may or may not be a copy protected video signal. That is, the input video signal may contain a basic copy protection signal such as automatic gain control (AGC) pulses or pseudo sync/AGC pulses, as depicted in a block 12 of FIG. 1 which receives the input video signal. The output of the basic copy protection process 12 is supplied to one input of a jumper J1, while the input video signal is also supplied directly to a second input of the jumper J1. The output of jumper J1 then supplies several blocks each of which comprises a respective modification which can be applied to the normal or copy protected video signal supplied via the jumper J1. The several blocks are each coupled to a combining circuit 14 such as, for example, a summing amplifier, via respective jumpers J2 through J7, as further described below. The normal or copy protected video signal from the jumper J1 also is supplied to the combining circuit 14 via one input of the jumper J7.

More particularly, the different modifications are selectively supplied to the combining circuit 14, along with the video signal via the jumper J7, by closure of one or more of the respective jumpers J2-J6. One such modification, a process 16 for adding a special narrow negative-going presync and very narrow positive-going pulse pair prior to the normal horizontal sync (H sync), is illustrated by a respective block. This embodiment of the invention is supplied to the combining circuit 14 by closing jumper J2, whereupon the presync/positive-going pulse pair is combined with the normal or copy protected video signal in the combining circuit 14 by closure of jumper J7.

The video signal supplied via the jumper J7 may be the normal or copy protected video signal from the jumper J1, which, however, has the color bursts therein removed by a color burst blanker process 18 if the respective input to the jumper J7 is closed. The color burst blanker process 18 is activated for example in a modification, described hereinafter, in which a new extended color burst is to be added to the video signal.

Another modification, a process 20 for extending an amplitude of a portion of an H sync signal whereby the AGC circuit in a respective VCR will be affected, is illustrated by a respective block. The resulting process 20 of an extended H sync amplitude portion is supplied to the combining circuit 14 by closure of the jumper J5, whereupon the extended H sync amplitude portion is combined with the video signal from the jumper J7 via the combining circuit 14.

A further modification, a process 22 for extending the amplitude of a portion of a pseudo sync pulse to affect the AGC circuit of respective VCRs, is illustrated by a respective block. Obviously, since a pseudo sync pulse is being extended, the basic copy protection process includes pseudo sync signals in the video signal, and is provided by the basic copy protection process 12 to the process 22. The process 22 supplies an amplitude extending pseudo sync portion to the combining circuit 14 via closure of the jumper J6, whereby the pseudo sync signal with the extended pseudo sync portion is combined with the video signal from jumper J7 via the combining circuit 14.

It is pointed out that the three modification processes 16, 20 and 22 of previous description provide enhanced effectiveness of the copy protection in a video signal when the signal is recorded illegally via a VCR and playback is attempted.

Another modification, a process 24 for adding a time extended color burst signal to a copy protected video signal, may be used to insure that a copy protection modification such as that of the process 16 of previous disclosure does not cause a color lock problem on some TV sets. The process 24 is supplied to the combining circuit 14 via closure of the jumper J3, wherein the extended color burst may be added to the video signal by the combining circuit 14 along with the presync/positive-going pulses provided by the process 16.

Still another modification, a process 26 for adding an extra (post) sync pulse after the normal H sync signal, may be used to reduce any picture shifting effects which may be caused by a modification process of a copy protection process such as for example the process 16 of previous description. The post H sync pulse from process 26 is supplied to the combining circuit 14 via closure of the respective jumper J4, whereupon the extra post H sync pulse may be added along with the signals of the process 16 to the video signal.

It is noted that the two processes 24, 26 provide enhanced playability of a copy protected video signal in TV sets.

Thus, the output of the combining circuit 14 is the sum or combination of the normal or copy protected video signal plus one or more of the various modifications as selected by the various jumpers.

Figure 2:
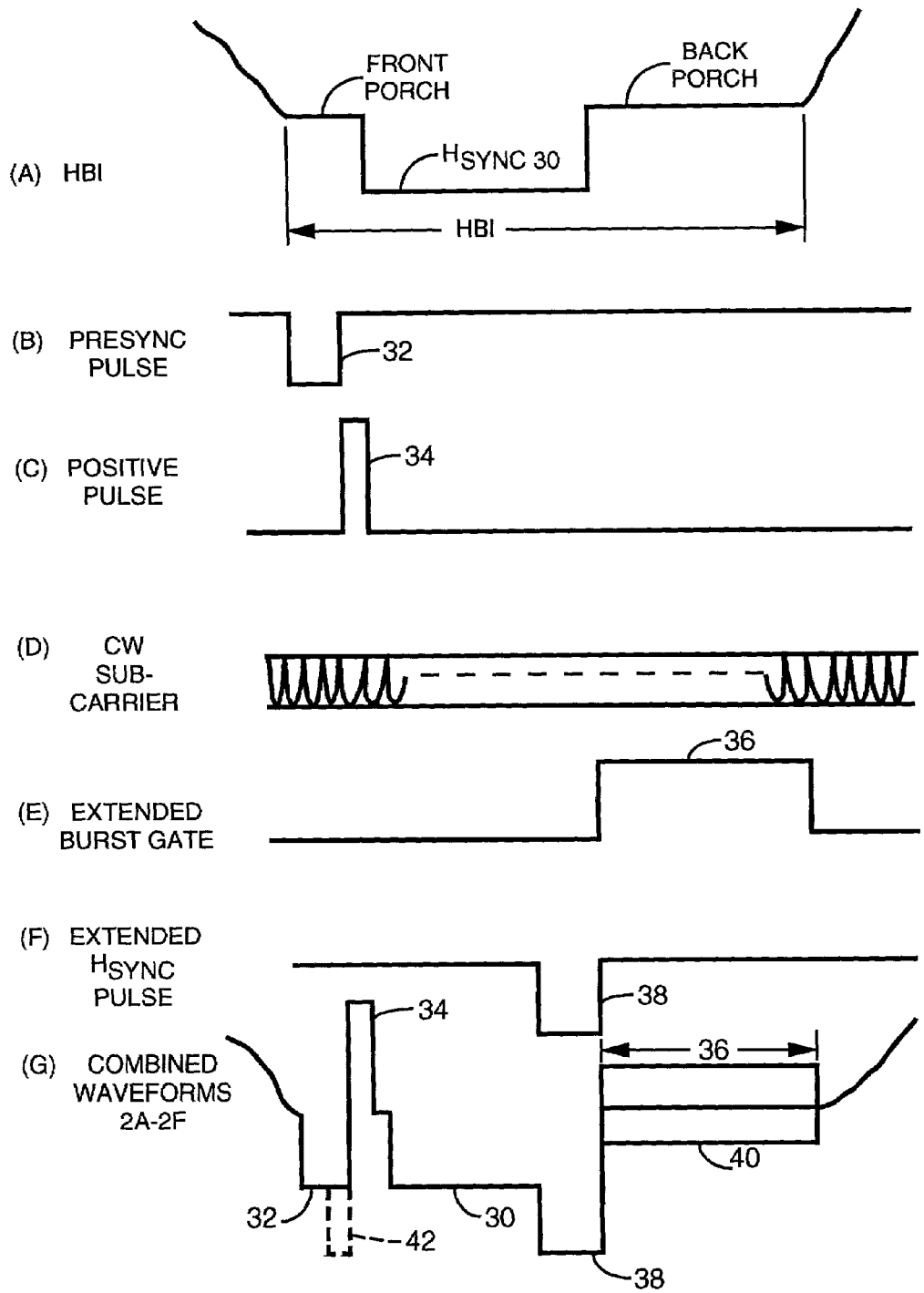
FIGS. 2A-2G is a chart illustrating waveforms generated via respective embodiments of the invention such as depicted for example in the block diagram of FIG. 1.

With regards now to FIGS. 2A-2G, the waveform illustrated in FIG. 2A shows a standard video signal, particularly in the HBI region, with a normal H sync signal 30 but with the color burst signal blanked as would occur if the jumper J7 of FIG. 1 selected the video signal path through the color burst blanker process 18.

FIG. 2B illustrates a waveform of a negative-going presync (pseudo sync) pulse 32 of the invention such as that provided via the process 16 of FIG. 1, which presync pulse occurs in the front porch region at the end of active video and prior to the normal H sync signal. The negative-going presync pulse 32 is narrow, for example, about 1.0 microsecond (μs) and has an amplitude similar to the normal H sync signal, namely, about −40 IRE. However the width of the presync pulse 32 can vary from about 0.8 to 1.3 μs, while the amplitude of the extension can vary about the 40 IRE level.

FIG. 2C illustrates a waveform of a narrow positive-going pulse 34 such as that generated in the process 16 of FIG. 1, which also occurs in the front porch region at the trailing edge of the presync pulse 32 and prior to the normal H sync. Thus the positive-going pulse 34 is very narrow, for example, about 0.3 to about 0.8 μs and has an amplitude of about 30 to 130 IRE.

FIG. 2D illustrates a waveform of a conventional regenerated continuous wave (cw) color subcarrier signal which extends in time generally over the duration of the HBI.

FIG. 2E illustrates a waveform of a time extending color burst gate signal 36 that is used with the regenerated cw color subcarrier signal to extract a portion of the subcarrier signal to synthesize a time extended color burst envelope, such as provided via the process 24 of previous description in FIG. 1.

FIG. 2F illustrates a waveform of an alternative embodiment of the invention which includes a pulse 38 which is coincident with a latter portion of the H sync signal 30. In this embodiment, the pulse 38 is added to a latter portion of the H sync signal to extend the amplitude along the latter portion thereof. By way of example, the amplitude extending pulse has a duration of about 1.0 to 1.5 μs and an amplitude of about 10 to 50 IRE. The process corresponds to the process 20 in FIG.

An amplitude extending pulse 42 also may be added to a latter portion of the presync pulse 32, such as depicted in phantom line in FIG. 2g.

FIG. 2G illustrates a waveform which is the result of combining the previous waveforms of FIGS. 2A-2F. The first portion of the front porch includes the negative-going presync pulse 32 shown in FIG. 2B. Pulse 32 is followed by the positive-going pulse 34 of FIG. 2C, wherein both pulses 32, 34 are inserted in the front porch region prior to the normal H sync signal 30. An amplitude extending pulse 38 is added to the latter portion of the H sync signal to provide the extended amplitude H sync signal such as that generated via the process 20 in FIG. 1. In addition, FIG. 2G may include a signal 40 corresponding to the extended color burst signal synthesized from the cw color subcarrier signal of FIG. 2D via the time extending burst gate signal 36 of FIG. 2E, and previously depicted as the process 24 disclosed in FIG. 1. It is understood that the time extending burst gate signal 36 and thus the time extended color burst signal 40 may coincide with any portion of the H sync signal 30 as well.

Figure 3:
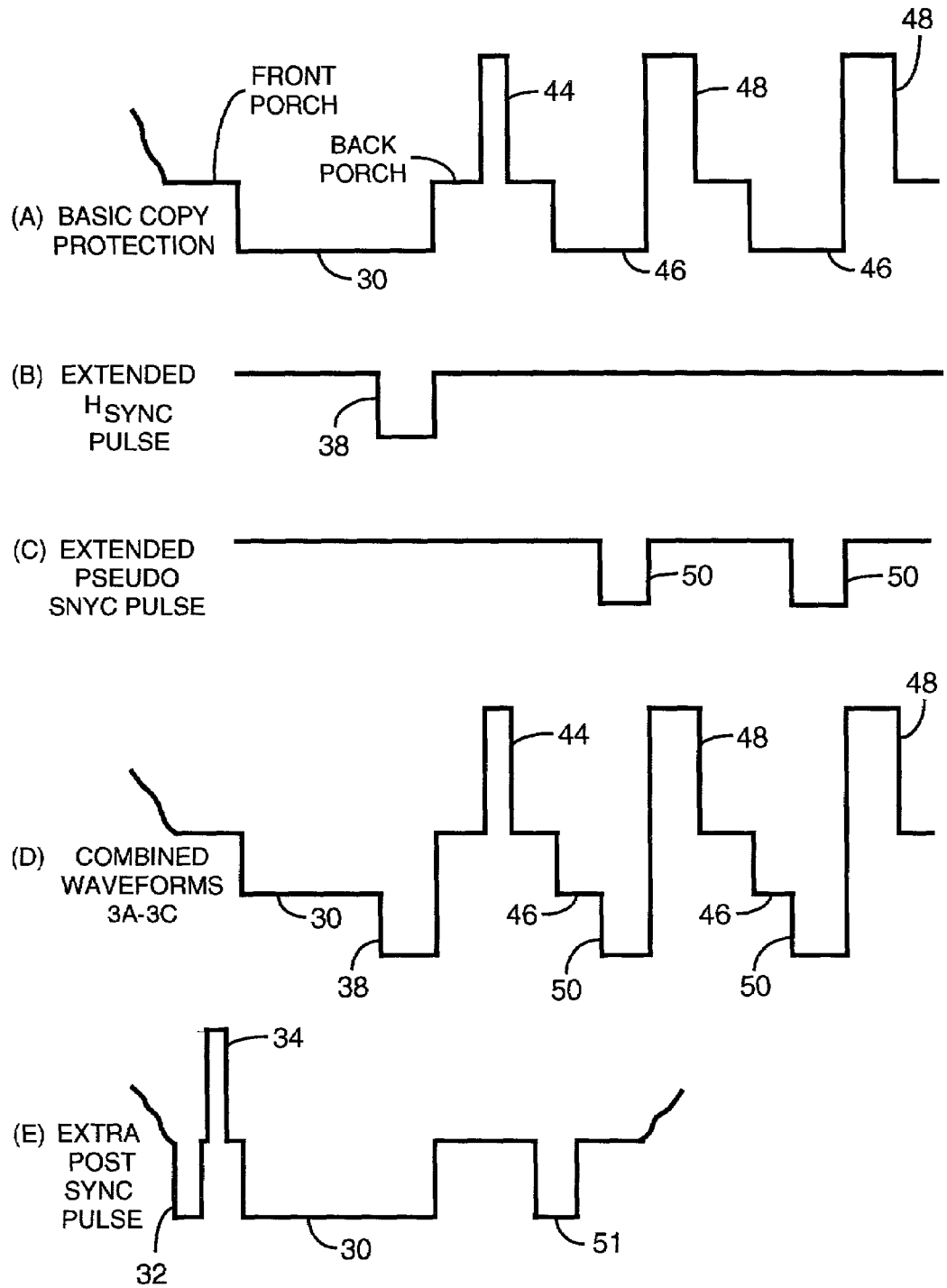
FIGS. 3A-3D is a chart illustrating waveforms generated via other respective embodiments of the invention depicted in the block diagram of FIG. 1.

FIGS. 3A-3D illustrate further modifications of additional embodiments in accordance with the invention. Thus, FIG. 3A illustrates a waveform of a video signal HBI including the H sync signal 30, but further including a known copy protection signal of an AGC pulse 44 in a back porch region of the HBI. Alternatively, a pseudo sync pulse 46 and an AGC pulse 48 may be added as pseudo sync/AGC pulse pairs to the back porch region. Pulse pair 46, 48 may exemplify the basic copy protection process 12 of FIG. 1.

FIG. 3B illustrates a waveform of the amplitude extending pulse 38, previously shown in FIG. 2F, which is coincident with the latter portion of the H sync signal 30. The addition of pulse 38 to the H sync signal provides an amplitude extension of the corresponding latter portion of the H sync signal.

In a further embodiment, FIG. 3C illustrates a waveform of a pulse 50 which is coincident with a latter portion of the pseudo sync pulse 46 of FIG. 3A and, in the manner of the pulse 38 added to the H sync signal 30, extends the amplitude of the latter portion of the pseudo sync pulse 46. This modification corresponds to the process 22 previously disclosed with reference to FIG. 1.

FIG. 3D illustrates a waveform which is a result of combining the waveforms of FIGS. 3A-3C. As may be seen, the amplitude extending pulse 38 is added to the level of the normal H sync signal 30 to provide an amplitude extended H sync signal. The AGC pulse 44 is added to the waveform in the back porch region. Alternatively, the amplitude extending pulse 50 may be added to respective pseudo sync pulses 46 to provide amplitude extended pseudo sync pulses. The amplitude extending pulse 38 can be added alone or in combination with the addition of the amplitude extending pulses 50.

FIG. 3E illustrates a waveform of an extra (post) sync pulse 51 such as provided via the process 26 of FIG. 1 and which is added to the video signal following the H sync signal in the back porch region, to reduce any picture shifting effects which may be caused by the presync/positive-going pulse pairs 32/34 of FIGS. 2B, 2C and 2G.

Figure 4:
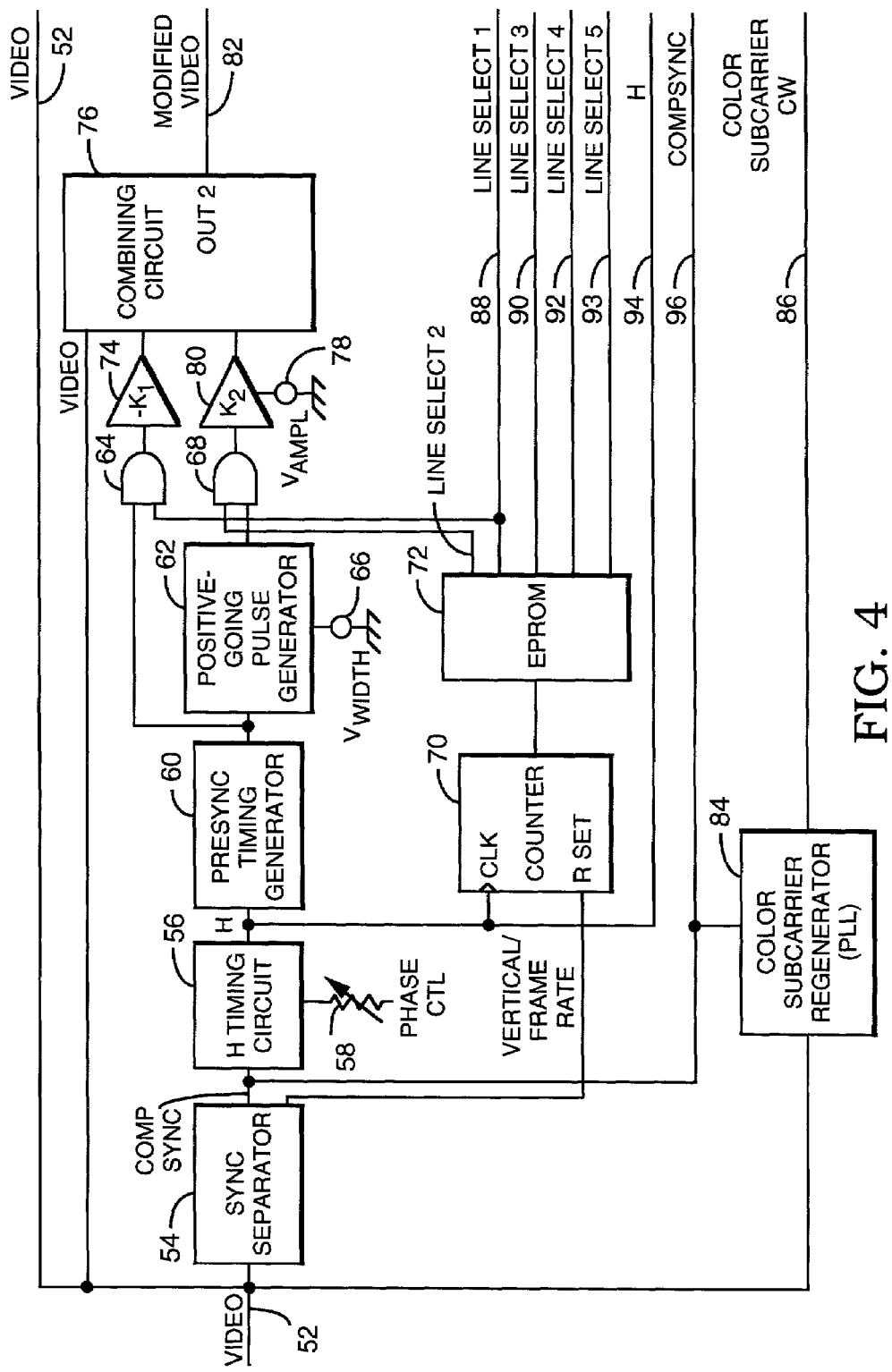
FIG. 4 is a block diagram illustrating an embodiment of the invention for generating and applying a negative-going presync and positive-going pulse pair to a normal or copy protected video signal.

FIG. 4 illustrates an embodiment of circuitry for adding the negative-going presync pulse 32 and the positive-going pulse 34 as a presync/positive-going pulse pair. The FIG. 4 also illustrates how the positive-going pulse 34 may be paired with each respective presync pulse 32 or may be paired with only some selected presync pulses 32. Generally, the presync pulses 32 are applied to video lines in the active TV field. However, if there are residual darkening effects or for any other reason, the positive-going pulses may be spread out over the active field in clusters, or may be spread out over a percentage of the active field video lines. For example, the percentage of positive-going pulses added to the lines containing negative-going pulses (presync pulses) may be about 10% to 30%. Also some or all of the positive-going AGC pulses may be amplitude, width, or position modulated.

Referring to FIG. 4, a normal or copy protected video signal is input into a sync separator circuit 54. A first output of circuit 54 is a composite sync signal which is coupled to an H timing circuit 56, which can be a horizontal PLL (phase lock loop) circuit, that is preferably timed to the HBI vicinity via a phase control 58. The output of H timing circuit 56 then is coupled to a presync timing generator 60 that creates the presync pulse 32 of FIGS. 2B and 2G prior to the H sync signal 30. Such a pulse 32 may start at the beginning of the front porch or, alternatively, may start near or within the end of the active video line. The output of presync timing generator 60 then is coupled to a positive-going pulse generator 62 and to an AND gate 64. The pulse generator 62 may comprise another timing circuit, which generates the pulse 34 of FIGS. 2C and 2G prior to the H sync signal 30 and after the presync pulse 32. The pulse generator 62 also has provision for applying pulse width modulation to the pulse 34 via a V width voltage source 66. The output of the pulse generator 62 then is coupled to an AND gate 68.

It is preferable to provide means for selecting specific video lines in which the presync and/or the positive-going pulses 32, 34 are to be inserted. To this end, a line selection circuit is formed of the sync separator circuit 54, the H timing circuit 56 and further includes a counter circuit 70 and an EPROM circuit 72. The sync separator circuit 54 provides a second output of a vertical rate or frame rate signal to reset the counter circuit 70. The H timing circuit 56 supplies an H rate signal to clock the counter circuit 70 at a horizontal frequency rate. The counter circuit in turn supplies selected pulses to the EPROM circuit 72. For example, sync separator circuit 54 may output a frame rate signal whereupon the counter circuit 70 counts from 1 to 525 (for a 525 TV line NTSC standard). The counts are supplied to the EPROM circuit 72 whose data output then assigns a logic level to each video line. A first output, line select 1, is coupled to the AND gate 64. The signal, line select 1, determines the line location of the presync pulse 32 and is supplied to AND gate 64, which is coupled to inverting scaling amplifier 74. A negative-going pulse is supplied from the amplifier 74 to a combining circuit 76 which synthesizes the presync pulse 34 on the video signal which it also receives via the input line 52. Typically, line select 1 is logic level high on the active field video lines, which may include at least a video line in the vertical blanking interval (VBI).

Another EPROM data output, line select 2, determines the video line location of the positive-going pulses 34. In one example, line select 2 is substantially identical to line select 1, so that each presync pulse 32 is paired with a positive-going pulse 34. In another example, line select 2 may be logic level high at a smaller group or groups of video lines in the active field. It follows that the positive-going pulse 34 is supplied to an AND gate 68 and is selected by the data output, line select 2, of the EPROM circuit 72. Also, the amplitude of the pulse 34 is determined by a Vampl voltage source 78 coupled to control an amplifier 80 which may be a voltage control amplifier. Since the control voltage Vampl may be fixed or dynamic, the resulting pulse 34 added to the video signal via the combiner circuit 76, may be of fixed level or of a selectable amplitude modulated level.

The output of the combiner circuit 76 is a video signal on line 82 modified to contain the pulses 32 in a first set (set 1) of selected video lines, and has positive-going pulses 34 inserted prior to the H sync pulse 30 in a second set (set 2) of selected video lines. As previously described, the positive-going pulses may be amplitude modulated or fixed.

The incoming video signal on input line 52 also is supplied to a color subcarrier regenerator 84, which also receives the composite sync signal (to form a color burst gate signal) from the sync separator circuit 54. The color subcarrier regenerator 84 may comprise a phase-lock loop (PLL) and supplies, on an output line 86, the regenerated cw color subcarrier signal previously described in FIG. 2 and provided via the process 24 in FIG. 1. Other output signals from the circuit of FIG. 4 include the line select 1 on an output line 88, and line select 3, 4 and 5 on output lines 90, 92 and 93. In addition, the H rate signal and the composite sync signal are provided on output lines 94 and 96, respectively. Various signals of FIG. 4 are supplied to the embodiment of the invention illustrated in FIG. 5, as is described hereinafter.

Figure 5:
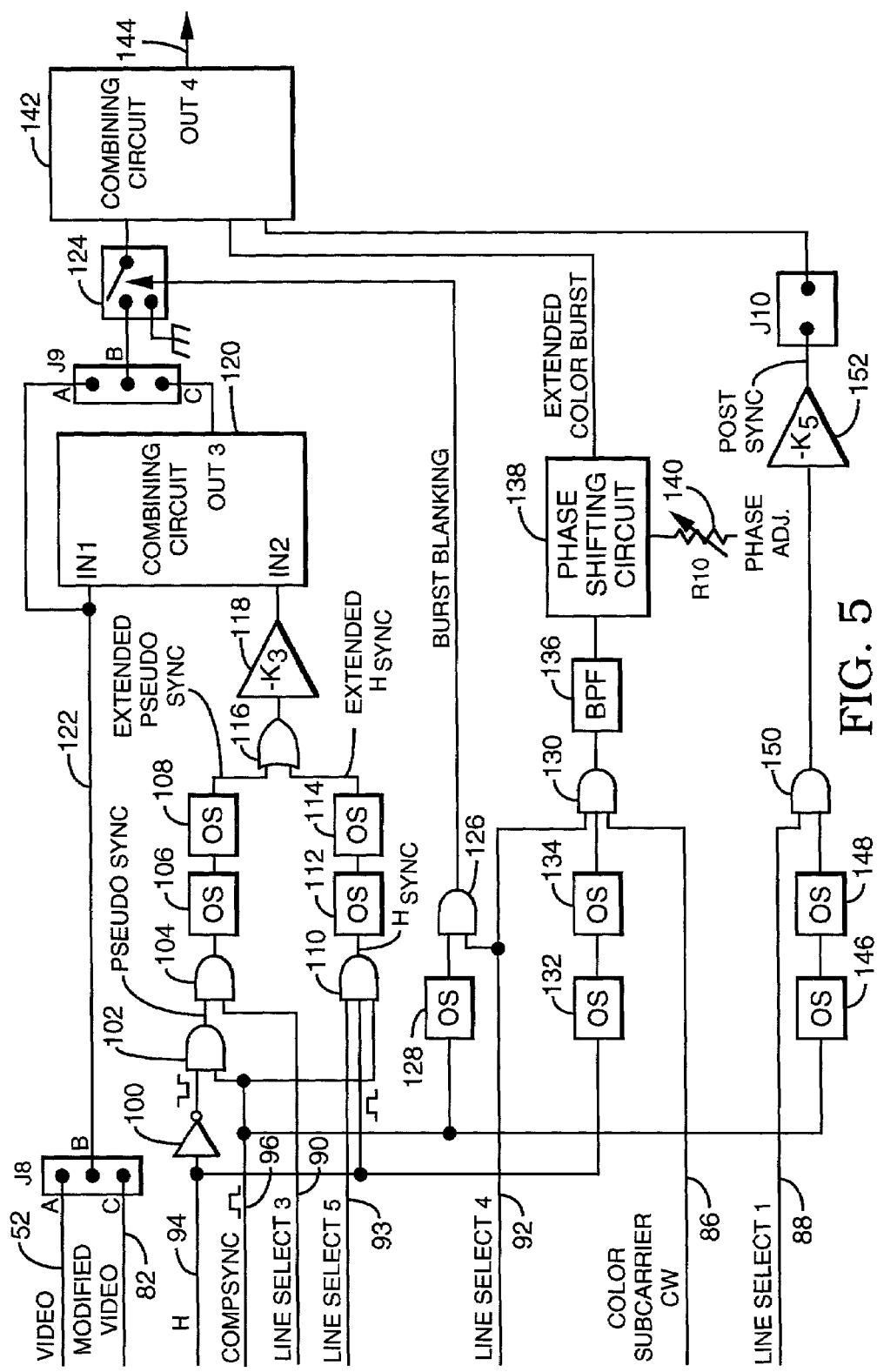
FIG. 5 is a block diagram illustrating another embodiment of the invention for generating and applying amplitude extending pulses to the H sync and/or pseudo sync signals, time extending color burst signals and/or extra post H sync pulses to a normal or copy protected video signal.

FIG. 5 illustrates other embodiments of the invention one of which extends the amplitude of the latter portion of the H sync pulses, and another which extends the amplitude of the latter portion of pseudo sync pulses. FIG. 5 also illustrates further embodiments for modifying a video signal by adding an extra negative-going (post sync) pulse after a H sync signal, and/or for modifying a video signal by extending a color burst envelope, which is useful for example in reducing picture shifting effects which may be caused by the process 16 described in FIG. 1.

Referring to FIG. 5, the horizontal blanking signal, H, generated in FIG. 4 and supplied on line 94, is coupled to an inverter 100 and thence to AND gates 102 and 104. The composite sync signal on line 96 of FIG. 4 is coupled to the AND gate 102 and the resulting pseudo sync pulses therefrom are supplied to the AND gate 104. AND gate 104 also receives an output from the EPROM circuit 72, viz, line select 3, whereby the pseudo sync pulses on video lines selected by line select 3 are converted to a logic level and are supplied to timing circuits formed of one-shots 106 and 108. One-shot 106 forms a time delay extending from the leading edge of the pseudo sync pulse, and one-shot 108 forms a pulse whose width is coincident with a latter portion of the pseudo sync pulse. The coincident pulse corresponds to the amplitude extending pulse 50 of FIGS. 3C, 3D as provided via a process 22 of FIG. 1.

Similarly, an AND gate 110 receives the signal H, the composite sync signal and a signal, line select 5 on lines 94, 96 and 93, respectively, from FIG. 4, and supplies pulses coincident with the H sync signal only on video lines selected by line select 5 signal. The output of AND gate 110 is coupled to timing circuits formed of one-shots 112 and 114. One shot 112 forms a time delay extending from the leading edge of the pulse of the selected H sync signal, while the one-shot 114 forms a H sync coincident pulse during a latter portion of the H sync signal. The H sync coincident pulse corresponds to the amplitude extending pulse 38 of FIGS. 2F, 2G as provided via a process 20 of FIG. 1.

The resulting amplitude extended H sync pulse 30, 38 and amplitude extended pseudo sync pulse 46, 50 are supplied to an OR gate 116, are OR'd together and selectively supplied to an inverting scaling amplifier 118. One input of a combining circuit 120 is coupled to the output of amplifier 118 and a second input thereof is coupled via a line 122 to either the original video signal on line 52 or the modified video signal on line 82 of FIG. 4, as directed by a jumper J8. The output of the combining circuit 120 is coupled to an input of a jumper J9, and adds the amplitude extended pseudo sync pulse 50 or the amplitude extended H sync pulse 38 to the respective pseudo sync pulse or H sync signal, in the modified or original video signal. The original video signal is supplied via the line 122 to a second input of the jumper J9, while the output of jumper J9 is coupled to an input of a switch 124. The other input of the switch 124 is grounded.

In another embodiment, if it is desirous to modify the video signal with an extended color burst (process 24 of FIG. 1 and waveforms of FIGS. 2D, 2E and 2G), the original color burst is substantially removed via a switch 124. The switch 124 is controlled by a burst blanking signal from an AND gate 126, which supplies a signal coincident with a portion of the back porch region. In turn, the AND gate 126 is responsive to a timing circuit formed of a one-shot 128, as is determined by a line select 4 signal on line 92 from the EPROM circuit 72 in FIG. 4. It follows that the output of switch 124 has the color burst signal removed in the video lines by line select 4.

An extended color subcarrier color burst 40 such as depicted in FIG. 2G and the process 24 of FIG. 1, is generated in FIG. 5 via an AND gate 130 which is coupled at one input to the signal, line select 4, on line 92 of FIG. 4. In addition, the H rate signal on line 94 is supplied to timing circuits formed of one-shots 132, 134 which in turn are coupled to a second input of AND gate 130. The color subcarrier cw signal on the line 86 from FIG. 4 is supplied to a third input of AND gate 130. The one-shot 132 forms a time delay extending from the beginning of the HBI, and the one-shot 134 produces a pulse in the HBI, preferably in the latter half of the HBI. The resulting time extended subcarrier color burst signal from the AND gate 130 is supplied to a band pass filter 136 (of 3.58 megahertz (MHz) for NTSC and 4.43 MHz for PAL color standards). The filtered signal is supplied to a phase shifting circuit 138 which is controlled by a phase adjusting device 140. The output of phase shifting circuit 138 is a time extended color burst signal applied only to those video lines selected by the line select 4 signal, which output is supplied to a combining circuit 142.

The combining circuit 142 receives the output from the switch 124, and in one embodiment combines the time extended color burst signal with the video signal that has had the color burst signal blanked via the circuits 124, 126, 128. The resulting output on line 144 from combining circuit 142 is a video signal with a time extended color burst such as burst 40 in FIG. 2G. The video signal may contain in addition basic copy protection signals, the negative-going presync and positive-going pulse pairs of the invention and/or the amplitude extended latter portions of the H sync signal or the pseudo sync pulse of the invention, as determined by the positions of the jumpers J8, J9 and switch 124.

In another embodiment, the extra post H sync pulse 51 of FIG. 3E is added in the back porch region of the HBI to offset a possible picture shift caused by the addition of for example, the presync/positive-going pulses in the front porch region. To this end, timing circuits formed of one-shots 146, 148 receive the composite sync signal on the line 96 from FIG. 4, and an AND gate 150 receives the line select 1 signal from FIG. 4 on line 88 as well as the output from the timing circuits. The one-shots 146, 148 generate a pulse coincident with a selected portion of the back porch region. The AND gate 150 supplies this pulse in the lines selected by the line select 1 signal to an inverting amplifier 152 which in turn supplies the negative-going pulse 51 of previous mention to the combiner circuit 142. With jumper J10 closed, the extra sync pulse 51 is added to the back porch region in the video signal supplied on an output line 144.

It should be noted that in certain embodiments the jumper J10 is kept open circuit so as to not add the pulse 51 in the back porch region, for example, when amplitude extending H sync signal modifications are generated (i.e., by circuits 110, 112, 114). The reason is that an extended latter portion of the H sync signal combined with an extra negative-going pulse in a back porch region may cause less copy protection effectiveness in a VCR.

Although the present invention has been described and illustrated in detail, it to be understood that the same is by way of illustration and example only and is not to be taken by way of limitation, the spirit and scope of the present invention being limited only by the terms of the appended claims and their equivalents.

The invention claimed is:

1. A method of modifying a video signal and/or copy protected video signal formed of video lines having horizontal blanking intervals (HBI), color burst signals, and/or horizontal (H) sync signals having a sync tip level, to provide a copy protection effect for the video signal or to enhance the copy protected video signal, wherein the copy protected video signal is viewable or watchable, comprising:
applying a negative-going presync pulse of substantially said sync tip level followed by a positive-going pulse in a front porch region of the HBI immediately prior to the H sync signal, to provide copy protection for the video signal or to enhance the playability and/or the effectiveness of the copy protected video signal.

2. The method of claim 1 wherein the negative-going presync pulse is about 0.8 to 1.3 microseconds duration and the positive-going pulse is about 0.3 to 0.8 microseconds duration.

3. The method of claim 2 wherein the negative-going presync pulse has an amplitude of about 40 IRE, and the positive-going pulse has an amplitude of about 30 to 130 IRE.

4. The method of claim 1 including:
inserting an additional portion of color burst signal in the front porch, H sync and/or back porch regions of the HBI.

5. The method of claim 1 including:
adding an extra post sync negative-going pulse after the H sync signal in the back porch region of the HBI.

6. The method of claim 1 wherein the negative-going presync pulse of substantially said sync tip level is applied at or within the end of the active video line.

7. The method of claim 1 wherein an additional negative-going pulse is added to at least a latter portion of the negative-going presync pulse.

8. A method of modifying a video signal and/or copy protected video signal including video lines having horizontal blanking intervals (HBI), color burst signals, pseudo sync signals, AGC signals, and/or horizontal (H) sync signals having a sync tip level, to provide a copy protection effect for the video signal or to enhance the copy protected video signal, wherein the copy protected video signal is viewable or watchable, comprising:
applying an added negative-going pulse to at least a portion of the H sync signal and/or an added negative going pulse to at least a portion of the pseudo sync signal, to provide a negative-going amplitude extension of the H sync signal and/or of the pseudo sync signal.

9. The method of claim 8 wherein the amplitude extending negative-going pulse added to the H sync and/or the pseudo sync signals has a duration of about 1.0 to 1.5 microseconds and an amplitude of about 10 to 50 IRE.

10. The method of claim 8 wherein the H sync or pseudo sync signal is reduced in amplitude.

11. A method of modifying a video signal and/or copy protected video signal formed of video lines having horizontal blanking intervals (HBI), color burst signals, and/or horizontal (H) sync signals having a sync tip level, to provide and/or enhance the video signal and/or copy protected video signal, wherein the copy protected video signal is viewable or watchable, comprising:
applying a narrow negative-going presync pulse of substantially said sync tip level in a front porch region of the HBI prior to the H sync signal; and
applying a narrow positive-going pulse between the narrow negative-going pulse and the H sync signal in a selected percentage of video lines which include the negative-going pulse, to provide copy protection while maintaining or enhancing the playability of the resulting copy protected video signal.

12. The method of claim 11 wherein the negative-going pulse has a duration of about 0.8 to 1.3 microseconds.

13. The method of claim 11 wherein the positive-going pulse has a duration of about 0.3 to 0.8 microseconds and an amplitude of about 30 to 130 IRE.

14. The method of claim 11 including:
amplitude modulating the positive-going pulse.

15. The method of claim 11 including:
modulating the pulse width of the positive-going pulse.

16. The method of claim 11 wherein the percentage of positive-going pulses added to the video lines with negative-going pulses is from 10% to 30%.

17. Apparatus for modifying a video signal and/or copy protected video signal formed of video lines having horizontal blanking intervals (HBI), color burst signals, and/or horizontal (H) sync signals having a sync tip level, to provide a copy protection effect for the video signal or to enhance the copy protected video signal, wherein the copy protected video signal is viewable or watchable, comprising:
a circuit for applying a negative-going presync pulse of substantially said sync tip level followed by a positive-going pulse in a front porch region of the HBI immediately prior to the H sync signal, to provide copy protection for the video signal or to enhance the playability and/or the effectiveness of the copy protected video signal.

18. The apparatus of claim 17 wherein the negative-going presync pulse is about 0.8 to 1.3 microseconds duration and the positive-going pulse is about 0.3 to 0.8 microseconds duration.

19. The apparatus of claim 18 wherein the negative-going presync pulse has an amplitude of about 40 IRE, and the positive-going pulse has an amplitude of about 30 to 130 IRE.

20. The apparatus of claim 17 including:
a circuit for inserting an additional portion of color burst signal in the front porch, H sync and/or back porch regions of the HBI.

21. The apparatus of claim 17 including:
adding an extra post sync negative-going pulse after the H sync signal in the back porch region of the HBI.

22. The apparatus of claim 17 wherein the negative-going presync pulse of substantially said sync tip level is applied at or within the end of the active video line.

23. The apparatus of claim 17 wherein an additional negative-going pulse is added to at least a latter portion of the negative-going presync pulse.

24. Apparatus for modifying a video signal and/or copy protected video signal formed of video lines having horizontal blanking intervals (HBI), color burst signals, pseudo sync signals, AGC signals, and/or horizontal (H) sync signals having a sync tip level, to provide a copy protection effect for the video signal or to enhance the copy protected video signal, wherein the copy protected video signal is viewable or watchable, comprising:
a circuit for applying an added negative-going pulse to at least a portion of the H sync signal and/or an added negative going pulse to at least a portion of the pseudo sync signal, to provide a negative-going amplitude extension of the H sync signal and/or of the pseudo sync signal.

25. The apparatus of claim 24 wherein the amplitude extending negative-going pulse added to the H sync and/or the pseudo sync signals has a duration of about 1.0 to 1.5 microseconds and an amplitude of about 10 to 50 IRE.

26. The apparatus of claim 24 wherein the H sync or pseudo sync signal is reduced in amplitude.

27. Apparatus for modifying a video signal and/or copy protected video signal formed of video lines having horizontal blanking intervals (HBI), color burst signals, AGC signals, and/or horizontal (H) sync signals having a sync tip level, to provide a copy protection effect for the video signal or to enhance the copy protected video signal, wherein the copy protected video signal is viewable or watchable, comprising:
a circuit for applying a narrow negative-going presync pulse of substantially said sync tip level in a front porch region of the HBI prior to the H sync signal; and
a circuit for applying a narrow positive-going pulse between the narrow negative-going pulse and the H sync signal in a selected percentage of video lines which include the negative-going pulse, to provide copy protection while maintaining or enhancing the playability of the resulting copy protected video signal.

28. The apparatus of claim 27 wherein the negative-going pulse has a duration of about 0.8 to 1.3 microseconds.

29. The apparatus of claim 27 wherein the positive-going pulse has a duration of about 0.3 to 0.8 microseconds and an amplitude of about 30 to 130 IRE.

30. The apparatus of claim 27 including:
amplitude modulating the positive-going pulse.

31. The apparatus of claim 27 including:
modulating the pulse width of the positive-going pulse.

32. The apparatus of claim 27 wherein the percentage of positive-going pulses added to the video lines with negative-going pulses is from 10% to 30%.

33. A method of modifying a video signal and/or a copy protected video signal formed of video lines having horizontal blanking interval (HBI), color burst signals and/or horizontal (H) sync signals having a sync tip level, wherein the copy protected video signal is viewable or watchable, comprising:
applying a negative-going presync pulse of substantially said sync tip level followed by a positive-going pulse in a front porch region of the HBI immediately prior to the H sync signal, to provide copy protection for the video signal or to enhance the playability and/or the effectiveness of the copy protected video signal.

34. Apparatus for modifying a video signal and/or a copy protected video signal formed of video lines having horizontal blanking interval (HBI), color burst signals and/or horizontal (H) sync signals having a sync tip level, wherein the copy protected video signal is viewable or watchable, comprising:
a circuit for applying a negative-going presync pulse of substantially said sync tip level followed by a positive-going pulse in a front porch region of the HBI immediately prior to the H sync signal, to provide copy protection for the video signal or to enhance the playability and/or the effectiveness of the copy protected video signal.

35. A method of modifying a video signal including video lines having horizontal blanking interval (HBI), pseudo sync, AGC, color burst, and/or horizontal (H) sync signals having a sync tip level, to provide a copy protection effect for the video signal or to enhance a copy protected video signal, wherein the copy protected video signal is viewable or watchable, comprising:
applying an additional negative-going pulse to at least a latter portion of the H sync signal and/or to at least a latter portion of the pseudo sync signal, to provide a negative-going amplitude extension of the H sync signal and/or of the pseudo sync signal.

36. The method of claim 35 wherein the H sync or pseudo sync signal is reduced in amplitude.

37. Apparatus for modifying a video signal formed of video lines having horizontal blanking interval (HBI), pseudo sync, AGC, color burst, and/or horizontal (H) sync signals having a sync tip level, to provide a copy protection effect for the video signal or to enhance a copy protected video signal, wherein the copy protected video signal is viewable or watchable, comprising:

a circuit for applying an additional negative-going pulse to at least a latter portion of the H sync signal and/or to at least a latter portion of the pseudo sync signal, to provide a negative-going amplitude extension of the H sync signal and/or of the pseudo sync signal.

38. A method of modifying a video signal and/or a copy protected video signal formed of video lines having horizontal blanking interval (HBI), AGC, color burst, and/or horizontal (H) sync signals having a sync tip level, wherein the copy protected video signal is viewable or watchable, comprising:

applying a negative-going presync pulse of substantially said sync tip level in a front porch region of the HBI prior to the H sync signal, to provide copy protection for the video signal or to enhance the playability and/or the effectiveness of the copy protected video signal.

39. The method of claim 38 wherein the H sync or pseudo sync signal is reduced in amplitude.

40. The method of claim 38 wherein the negative-going presync pulse is about 0.8 to 1.3 microseconds duration.

41. The method of claim 40 wherein the negative-going presync pulse has an amplitude of about 40 IRE.

42. The method of claim 38 wherein the negative-going presync pulse is applied at or within the end of the active video line.

43. The method of claim 38 wherein an additional negative-going pulse is added at least to a portion of the negative-going presync pulse.

44. Apparatus for modifying a video signal and/or a copy protected video signal formed of video lines having horizontal blanking interval (HBI), pseudo sync, AGC, color burst, and/or horizontal (H) sync signals having a sync tip level, wherein the copy protected video signal is viewable or watchable, comprising:

a circuit for applying a negative-going presync pulse of substantially said sync tip level in a front porch region of the HBI prior to the H sync signal, to provide the modification of the video signal and/or of the copy protected video signal.

45. The apparatus of claim 44 wherein the negative-going presync pulse is about 0.8 to 1.3 microseconds duration.

46. The apparatus of claim 45 wherein the negative-going presync pulse has an amplitude of about 40 IRE.

47. The apparatus of claim 44 wherein the negative-going presync pulse is applied at or within the end of the active video line.

48. The apparatus of claim 44 wherein an additional negative-going pulse is added to at least a portion of the negative-going presync pulse.

* * * * *